United States Patent [19]

Coomans et al.

[11] Patent Number: 4,952,841

[45] Date of Patent: Aug. 28, 1990

[54] HIGH-PRESSURE DISCHARGE LAMP WITH IMPROVED ELECTRODES

[75] Inventors: Abraham Coomans, Eindhoven; Wilhelmus C. der Kinderen, deceased, late of Veldhoven; Friedrich J. de Haan, administrator, Dommelen, all of Netherlands

[73] Assignee: U.S. Philips Corporation, New York, N.Y.

[21] Appl. No.: 884,693

[22] Filed: Jul. 11, 1986

[30] Foreign Application Priority Data

Jul. 17, 1985 [NL] Netherlands ........................ 8502052

[51] Int. Cl.[5] ............................................ B01J 61/073

[52] U.S. Cl. .................................... 313/631; 313/628; 313/574; 445/46; 445/51

[58] Field of Search ............... 313/628, 631, 633, 575, 313/576, 574, 344; 445/46, 50, 51

[56] References Cited

U.S. PATENT DOCUMENTS

| | | | |
|---|---|---|---|
| 3,132,409 | 5/1964 | Freeman | 313/628 |
| 3,170,081 | 2/1965 | Rokosz | 313/631 |
| 4,150,317 | 4/1979 | Laska et al. | 313/631 |
| 4,319,158 | 3/1982 | Watanabe et al. | 313/633 |
| 4,559,473 | 12/1985 | McVey | 313/631 |

*Primary Examiner*—Donald J. Yusko
*Assistant Examiner*—Michael Horabik
*Attorney, Agent, or Firm*—Brian J. Wieghaus

[57] ABSTRACT

The high-pressure discharge lamp has electrodes which comprise a tungsten rod (24) which projects inside the lamp vessel and around whose end (25) projecting inside the lamp vessel a tungsten wire portion (26) is helically wound. The ends (30, 31) of the helically wound wire portion (26) are located within the sheath (29) of this wire portion (26) and the end faces (32, 33) are rupture surfaces devoid of burrs.

9 Claims, 1 Drawing Sheet

HIGH-PRESSURE DISCHARGE LAMP WITH IMPROVED ELECTRODES

BACKGROUND OF THE INVENTION

The invention relates to a high-pressure discharge lamp comprising a translucent lamp vessel, and sealed in a vacuum-tight manner, which is filled with ionizable gas. Electrodes project into the lamp vessel and are connected to current supply conductors which extend to the exterior through the wall of the lamp vessel. The electrodes each comprise a rod of mainly tungsten, around which is wound at its end projecting inside the lamp vessel a wire portion of mainly tungsten, having ends with end faces. Such a lamp is known inter alia from British Patent Application No. 8,331,819 to which U.S. Pat. No. 4,594,529 corresponds.

The wire helically wound around the rod of electrode may have for its object solely to obtain a satisfactory temperature distribution over the electrode, but may also serve to hold electron-emitting material.

During the operation of helically winding the wire, the beginning part of the wire must be held, for example, in a clamp and after the operation of winding the wire has been accomplished, the wound wire portion must be separated from the remaining non-wound wire. The clamped beginning part of the wire must also be removed. The wound wire portion is freed from the non-wound beginning and end parts by clipping, pinching, grinding or cutting. Burrs are then formed mostly at the end faces of the wound wire portion. Due to the fact that the wound wire portion is freed, its ends spring out because they were deformed to a lesser extent during winding than parts remote from the ends. Moreover, it is not possible to approach the wound wire portion with the tools very closely, the less so if this wire portion must not be damaged. In high pressure discharge lamps manufactured in mass production, the ends of the helically wound wire portion therefore project for a considerable part beyond the sheath of the helical portion and the end faces have a burr.

However, projecting ends may be disadvantageous because they may form a preferential area at which the discharge arc can terminate or because upon ignition of the lamp they prevent the discharge arc from soon terminating on the tip of the electrode. They may also be disadvantageous if during manufacture of the lamp the electrodes must be slipped inside through a narrow opening of the lamp vessel.

The invention has for its object to provide a solution for the problem of projecting ends in discharge lamps comprising rods provided with a winding and to provide lamps having electrodes of a construction that can be manufactured in a simple manner.

SUMMARY OF THE INVENTION

According to the invention, this object is achieved in a lamp of the kind described in the opening paragraph in that the ends of the wire portion are located at least substantially within the sheath of the helically wound wire portion and in that the end faces are rupture or fracture surfaces.

Rupture or fracture surfaces have a typical structure, by which they are distinguished from surfaces obtained by cutting, pinching, clipping or grinding. Their surface is rough and is devoid of tracks, such as grooves, which are left by tools in separation surfaces. Due to the roughness of the surface, the letter also becomes dull.

Furthermore, with rupture surfaces, a burr left by tools is absent. Rupture surfaces can therefore be readily recognized by those skilled in the art.

The helically wound wire of the electrode of the lamp according to the invention can be obtained in that, after the operation of helically winding the wire has been accomplished, the remaining part of the wire not helically wound is severed from the helically wound wire portion by applying a tensile force to the wire. The wire then breaks or ruptures at the area at which the wire loses the contact with the rod onto which it is wound.

The invention is based on the recognition of the fact that the force exerted on the wire during the rupturing step produces a plastic deformation in the end of the wound wire portion. Deformations have also occurred during the operation of winding the wire portion between the ends of this wound portion. Due to this plastic deformation, upon tearing off, the relevant end of the helically wound wire portion is located at least substantially within the sheath of wound portion. The rupture surface is flat and free from burrs. At the area immediately adjoining the rupture surface, the wire has a smaller diameter than at areas more remote from the rupture surface. If before winding the wire is heated, for example at a temperature lying in the range of from 800° to 850° C., in order to straighten the wire, the diameter reduction is larger than if the wire has not been heated or has been heated at a lower temperature. The first end of the wire, which is held by a clamp during the winding, can be severed from the wound wire portion by exerting a tensile force until rupture occurs.

The rod onto which the wire is wound may be the electrode rod or an auxiliary rod which is separated from the wound wire portion, after which the wound wire portion is arranged to surround the electrode rod. The wound wire portion may be fixed on the electrode rod, for example, by a weld.

The helically wound wire portion may be disposed in several (for example two) layers around the electrode rod, a first layer of turns being directly disposed around the electrode rod and a second layer of turns surrounding the first layer, Alternatively, the helically wound wire portion around the electrode rod may be surrounded by a separate helically wound wire portion.

The lamp according to the invention may be a high-pressure sodium lamp provided with a ceramic lamp vessel of, for example, aluminium oxide or sapphire or may be a high-pressure mercury vapor discharge lamp which may contain metal halides and has a ceramic or quartz glass lamp vessel.

BRIEF DESCRIPTION OF THE DRAWING

Embodiments of the lamp according to the invention are shown in the drawing. In the drawing.

DETAILED DESCRIPTION OF THE INVENTION

Figure 1:
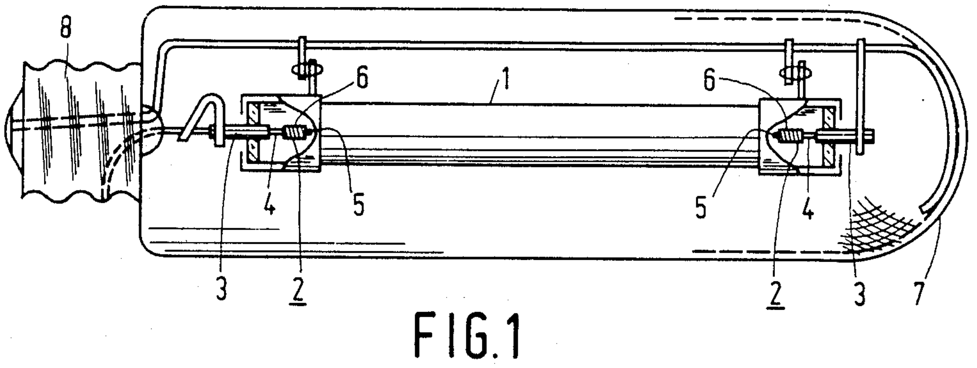
FIG. 1 shows in developed side elevation a high-pressure sodium discharge lamp.

The high-pressure sodium discharge lamp shown in FIG. 1 has a translucent lamp vessel 1 of mainly aluminium oxide, which is sealed in a vacuum-tight manner and has an ionizable filling of sodium, mercury and xenon. Electrodes 2 project into the lamp vessel 1 and are connected to current supply conductors 3, which extend to the exterior through the wall of the lamp vessel. The electrodes 2 each have a rod 4 of mainly tungsten, around which at their ends 5 projecting inside the lamp vessel 1 a wire portion 6 of mainly tungsten is helically wound. The ends of the wire portion 6 are located within the sheath of the helically wound wire portion 6 and its end faces are rupture surfaces devoid of burrs. The lamp vessel 1 is mounted within an outer envelope 7, which has at one end a lamp base 8 to which the current supply conductors 3 are connected.

Figure 2:
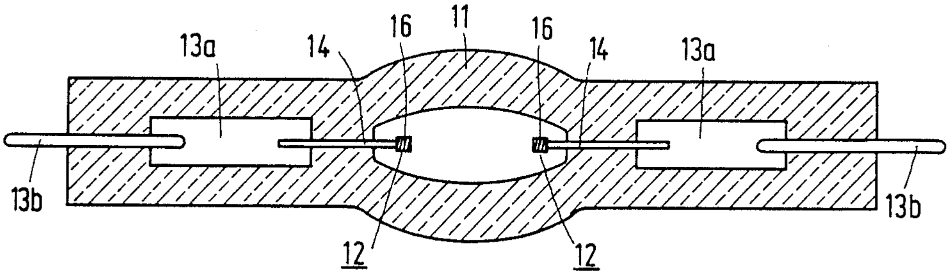
FIG. 2 shows in longitudinal sectional view a high-pressure mercury vapour discharge lamp.

The high-pressure mercury vapour discharge lamp shown in FIG. 2 has a quartz glass lamp vessel 11, which is sealed in a vacuum-tight manner and has an ionizable filling or argon, mercury, sodium-, scandium- and thorium-iodide. Electrodes 12 connected to current supply conductors 13*a*, 13*b* projecting beyond the lamp vessel 11 project into the lamp vessel 11. They have an electrode rod 14, around which at its end projecting within the lamp vessel 11 a wire portion 16 of mainly tungsten is helically wound. The ends of this wire portion 16 are located within the sheath of the helically wound wire portion 16 and its end faces are rupture surfaces devoid of burrs.

Figure 3:
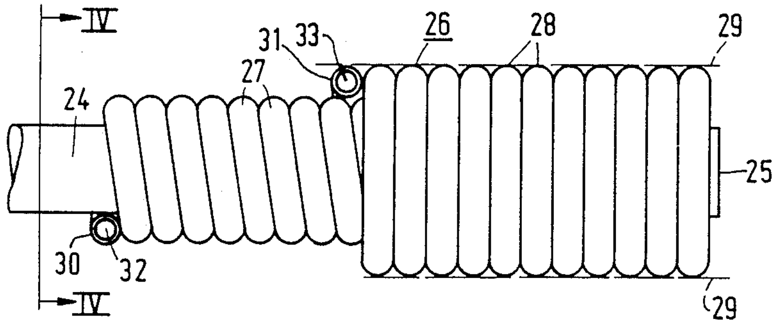
FIG. 3 shows an electrode is side elevation.
Figure 4:
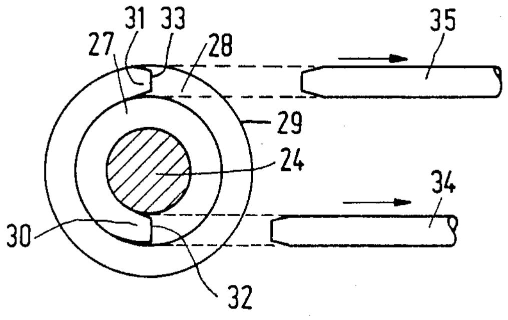
FIG. 4 shows a diagrammatic representation of a sectional view of the electrode shown in FIG. 3 taken on the line IV—IV.

In FIGS. 3 and 4, the electrode rod 24 of mainly tungsten has at one end 25 a helically wound wire portion 26 of mainly tungsten. The electrode rod 24 is directly surrounded by a first layer of turns 27, whose turn lying closest to the end 25 of the rod 24 passes into the turn lying closest to this end 25 of a second layer of turns 28, which surrounds the first layer of turns 27 over a part of its length. The sheath of the helically wound wire portion 26 is denoted by reference numeral 29. The ends 30 and 31 of the wire portion 26 are located within the sheath 29. The end faces 32 and 33 are rupture surfaces devoid of burrs. The ends 30 and 31 have a diameter smaller than that of the wire portion 26 remote from those ends. The wire portion 26 is fixed on the rod 24 by means of a weld made on a turn 27.

For explanation, in FIG. 4 the beginning part 34 of the wire is indicated, from which the wire portion 26 is wound, while reference numeral 35 denotes the remaining part of this wire. During the operation of winding the wire portion 26, the beginning part 34 was fixed in a clamp. The wound wire portion 26 was subjected during winding to a tensile force of 0.6N, which gave rise to a plastic deformation of the wire portion 26.

In a 30W metal halide lamp as shown in FIG. 2, electrodes of the kind shown in FIG. 3 were used, in which the electrode rod had a diameter of 140 $\mu$m and a wire having a diameter of 50 $\mu$m was wound around this rod over a length of 1 mm. The wound wire portion was wound with a pitch equal to its own diameter. In the first layer, the wire portion had twenty turns. It was wound back in a second layer over the first layer with eleven turns. The beginning part and the remaining non-wound wire were torn off with a force of 5N, which resulted in a reduction in diameter near the rupture surfaces.

Although in this lamp the wound wire portion was wound with a pitch equal to its own diameter, the wire portion could have been wound with a higher pitch or over a part of its length with a higher pitch, for example in a few turns of the first layer. The wire portion and the rod contained tungsten and 1.5% by weight of $ThO_2$.

What is claimed is:

1. A high pressure discharge lamp, comprising:

(a) an outer lamp envelope; and (b) a high pressure discharge device energizable for emitting light within said outer envelope having a pair of discharge electrodes, each of said electrodes comprising an electrode rod and a length of wire having a nominal diameter wound in a coil disposed around said electrode rod, said length of wire terminating a burr-free end portions each with end faces having a diameter smaller than said nominal diameter and an annular bevelled surface extending between said end face and said nominal diameter to substantially define a truncated cone having its smallest diameter at said end face and its largest diameter at said nominal diameter, said end faces being rough and at least substantially flat.

2. A high pressure discharge lamp as claimed in claim 1, wherein said wire portion is disposed around said electrode rod in a helical fashion to form a coil, said coil being enclosed by an imaginary cylinder, and said end faces are rupture surfaces located at least substantially within said imaginary cylinder.

3. A lamp as claimed in claim 2, wherein said rupture surfaces are formed by coiling a piece of wire around a mandrel in a helical fashion to form said coil and separating any excess wire by applying a tension force to the wire so that the breaking stress is exceeded and the wire ruptures.

4. A lamp as claimed in claim 3, wherein said mandrel is said electrode rod.

5. A lamp as claimed in claim 4, wherein said wire portion is comprises of tungsten and has been heated to a temperature between 800 to 850 degrees Celsius prior to forming said coil.

6. A discharge lamp discharge electrode, comprising:

an elongate electrode rod having an end defining a tip end of said discharge electrode; and an electrode coil on said rod, said electrode coil comprising a length of wire helically wound in a layer on said electrode rod, extending along the length dimension of said electrode rod and terminating at burr-free end portions of said length of wire each of said end portions of said length of wire having a substantially circular cross section which becomes progressively smaller in the direction of the end of said end portion, and each of said end portions terminating at a rough and substantially flat end face of said wire. .

7. A discharge lamp discharge electrode, according to claim 6:

wherein each of said wire end portions having said shapes of progressively smaller diameter and substantially flat rough end faces are formed by tensile rupture.

8. A discharge lamp discharge electrode according to claim 7:

wherein said electrode coil is comprised of said length of wire continuously helically wound is said layer on said electrode rod and in a second layer on said first-mentioned layer, said electrode coil comprising said length of wire helically wound in said first layer on said electrode rod extending along the length dimension of said electrode rod up to a position proximate said discharge electrode tip end, helically wound in a second layer on said first layer extending along the length dimension of said electrode rod in a direction away from said tip end and terminating at burr-free end portions of said length of wire, each of said end portions of said length of wire having a substantially circular cross section which becomes progressively smaller in the direction of the end of said end portion, and each said end portion terminating at a rough and substantially flat end face of said wire.

9. A discharge lamp discharge electrode according to claim 8:

wherein each of said wire end portions having said shapes of progressively smaller diameter and substantially flat rough end faces are formed by tensile rupture.

* * * * *